United States Patent Office 3,240,659
Patented Mar. 15, 1966

3,240,659
BONDING OF NITRILE RUBBERS TO POLY-
ETHYLENE TEREPHTHALATE
Everett C. Atwell, Greensboro, N.C., assignor to Burlington Industries, Inc., Greensboro, N.C., a corporation of Delaware
No Drawing. Filed Nov. 9, 1960, Ser. No. 68,145
5 Claims. (Cl. 161—170)

The present invention relates to certain improvements in the bonding of nitrile rubber, particularly butadiene-acrylonitrile rubber, to polyethylene terephthalate fibers.

The difficulties involved in obtaining good adhesion between nitrile rubber and polyethylene terephthalate fibers are well known in the art and numerous proposals have been made for obtaining an improved bond. However, there is still a real need for new methods and techniques which will provide optimum adhesion between these materials.

Accordingly, the principal object of the present invention is to provide a method of bonding nitrile rubber to polyethylene terephthalate fibers whereby remarkably outstanding adhesion is obtained. A more specific object of the invention is the provision of a unique pretreatment for polyethylene terephthalate fibers to facilitate increased adhesion to butadiene-acrylonitrile rubber. Other objects of the invention will also be hereinafter apparent.

Broadly stated, the invention contemplates the use of two specific primers which, when used together, give a surprisingly high bonding effect between nitrile rubber and polyethylene terephthalate. One of these primers comprises an organic polyisocyanate such as methylene bis (4-phenylisocyanate). The other primer is an aqueous composition comprising a butadiene-acrylonitrile copolymer rubber latex and a partially condensed resorcinol-formaldehyde reaction product, notably one of the compositions described in my copending applications Serial No. 42,956, now Patent No. 3,030,230, or Serial No. 49,179, the subject matter of which is incorporated herein by reference.

The reasons for the unique results obtained herein are not fully understood. However, it is apparent that the two primers are mutually adhesive and coact in some unusual way to give a degree of bonding which is significantly in excess of the expected additive effect based on the use of each primer separately. As a matter of fact, treatment of the polyethylene terephthalate with either of the primers alone does not result in any commercially important increase in adhesion above that found between untreated polyethylene terephthalate and the rubber whereas, under otherwise comparable conditions, the method of the present invention increases the adhesion to a commercially significant value which may be 20–25 times the adhesion between the untreated materials, or even greater. The unique results of the invention also appear to be specific to the bonding of nitrile rubbers since the dual primers of the invention do not give this improved degree of bonding with other rubbers, e.g., natural rubber, butadiene-styrene rubber and/or neoprene rubber.

In carrying out the present process, the polyethylene terephthalate fibers (as such or in fabric form) are first impregnated with an organic polyisocyanate. For this purpose, there may be used a solution of the polyisocyanate in moisture-free organic solvent, e.g., chlorinated or alkylated aromatics such as monochlorobenzene; xylene or toluene. While the amount of isocyanate can be widely varied, it is usually desirable to apply a minimum of 0.5% polyisocyanate solids, based on the weight of dry polyethylene terephthalate fibers. An economically practical limit is 2–2.5% polyisocyanate solids. A maximum of 5% is usually in excess and does not provide any further improvement.

As indicated above, methylene bis (4-phenylisocyanate) is a typical polyisocyanate suitable for priming polyethylene terephthalate fibers according to the invention. Monoisocyanates are unsatisfactory but other organic polyisocyanates which may be used are polymethylene polyphenyl polyisocyanate having the formula:

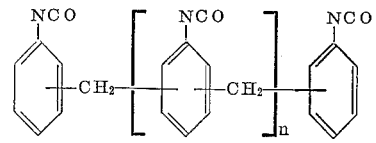

wherein $n$ is an integer, e.g., the product known as PAPI–1 (Carwin Company), in which $n$ has an average value of 1; Mobay's toluene diisocyanate polymer Mondur CB–60; triphenylmethane triisocyanate (Mondur TM); 3,3-dimethoxyl-4,4'-biphenylene diisocyanate; and p-p'diphenylmethane diisocyanate (Mondur MO).

After the polyisocyanate has been applied as the first primer, the treated polyethylene terephthalate fibers are dried for solvent removal prior to application of the second primer. Usually, the treated material is heated until dry, using temperatures between 200–300° F. The dried, isocyanate treated polyethylene terephthalate fibers may then be treated, either immediately or after storage, with the second primer of the invention. Advantageously the dried isocyanate-treated material is tack-free and may be rolled up and stored without need for subsequent reactivation of the primer and without detriment to the working properties of the material.

As the second primer, there may be used any of the aqueous butadiene-acrylonitrile latex/resole compositions described in my above-mentioned application Serial Nos. 42,956 and 49,179. It is also possible to modify these aqueous latex/resole compositions to include an organic solvent although organic solvent-free aqueous compositions are preferred. Additional components, e.g., zinc oxide, and/or softening, wetting and antifoaming agents, etc., may also be included in this priming composition, if desired. Further details regarding the preparation of these latex/resole compositions are included below.

Any commercially available butadiene-acrylonitrile polymer rubber latex containing from 25 to 45% by weight of bound acrylonitrile may be used in making up the latex/resole primers of the invention. Suitable nitrile latices of this type are available under the tradenames "Butaprene," "Hycar," Nitrex," and "Chemigum" latices.

The latex/resole composition may be applied to the isocyanate-treated polyethylene terephthalate fibers in any convenient fashion, e.g., by dipping, padding or spraying. The amount of resole/latex primer applied to the polyethylene terephthalate fibers will vary depending, for example, upon the weight and construction of the polyethylene terephthalate material. Typically, the amount of add-on solids to the applied will usually fall within the range of 5 to 15% by weight of the fibers but it will be realized that the specific amount of add-on solids necessary to give maximum mutual bonding will vary from one situation to another. Usually, the ratio of resole to latex solids, in parts of soids by weight, will come within the range of from about 1:12 to about 1:2.5, preferably 1 part resole solids per 3.5 to 10 parts latex solids.

After impregnation, all of the water should be removed from the goods by drying. Various drying temperatures and drying rates may be used so long as the fibrous material is completely dry prior to the step of bonding to the nitrile rubber.

The dried dual primed polyethylene terephthalate prepared in the manner described above, is also characterized by its non-tacky nature and can be rolled up and stored for long periods of time without losing its bonding affinity for the nitrile rubber. As will be appreciated, this represents an outstanding advantage since the dried fibrous material can be stored until the rubber is to be applied thereto. A unique feature of the dried material is that, even after long storage, no reactivation of the treated fabric surface is necessary for effective bonding with nitrile rubber. This is in contrast to known adhesive treated fabrics wherein reactivation, for example, by organic solvent treatment or water, is essential to effect bonding after storage.

The dual primed polyethylene terephthalate fibers, in yarn or fabric form or otherwise, may be bonded to any vulcanizable butadiene-acrylonitrile rubber or composition of the same. Typical nitrile rubber compositions will usually have the following representative makeup:

| | Parts |
|---|---|
| Butadiene-acrylonitrile rubber | 100 |
| Zinc oxide | 5–20 |
| Sulfur | 2–3 |
| Stearic acid | 1 |
| Benzothiazyl disulphide or the like | 1–2 |

The butadiene-acrylonitrile copolymer rubbers usually contain about 25 to 45% nitrile and are available under the tradenames of "Hycar OR," "Butaprene N," "Buna N," "Paracril," "Perbunan" and "Chemigum" nitrile rubbers.

The nitrile rubber may be applied to the dual treated polyethylene terephthalate in conventional fashion. Thus, for example, a compounded nitrile rubber composition as referred to above in sheet form may be pressed against the dual primed polyethylene terephthalate fabric prepared according to the invention and vulcanized under conventional conditions (e.g., 280° F. to 300° F. and desirably 150 to 250 p.s.i. pressure for 30 to 60 minutes).

According to one preferred embodiment of the invention, a butadiene-acrylonitrile copolymer rubber, e.g., Buna N, is bonded to polyethylene terephthalate fibers by first pretreating the fibers with an organic solvent solution of methylene bis (4-phenylisocyanate) or the equivalent and then, after drying, with an aqueous emulsion of butadiene-acrylonitrile polymer latex and resorcinol-formaldehyde prepared as described in Serial Nos. 42,956 and 49,179. This last-mentioned emulsion may also include zinc oxide and one or more conventional softeners, wetting agents and antifoaming agents.

The invention is illustrated, but not limited by the following examples wherein parts and percentages are by weight unless otherwise stated:

EXAMPLE I

This example describes the preparation of a suitable resole/latex composition suitable for use herein as the second primer.

RESOLE/LATEX PRIMER

*Part A*

| | Parts |
|---|---|
| Resorcinol | 5.1 |
| 37% formaldehyde | 6.5 |
| NaOH flakes | .15–.30 |
| Water | 110 |
| | 122 (approximately) |

*Part B*

| | Parts |
|---|---|
| Resin master (Part A) | 122 (approximately) |
| 42% butadiene-acrylonitrile copolymer latex (Hycar 1571) | 181 |
| 10% Igepal CO–880 | 9.4 |
| 20% Dow antifoam B | 10 |
| Water | 260 |
| | 582.4 |

*Preparation of Part A*

90% of the water for Part A was measured into the resin preparation tank. The caustic soda flakes were added and the mixture stirred until the caustic was dissolved. The resorcinol was then added and dissolved by stirring. The formaldehyde and balance of the water were then added, the temperature of the water having been previously adjusted to 80° F. The resulting mixture was aged for 6 hours under controlled temperature conditions of 80–84° F. At the end of the 6 hours, the resulting resole resin solution (Part A) was used in the preparation of the bonding composition (Part B).

*Preparation of Part B*

The Hycar 1571 was measured into a mixing tank with stirring. The Igepal solution was added followed by the antifoam solution. The water and resin solution (Part A) were then slowly added.

The resulting dispersion was ready for immediate use but may be stored for a limited time (about two days) at room temperature, or, for prolonged periods of time, under refrigeration.

EXAMPLE II

The resole/latex primer of Example I was also prepared by repeating Example I except that Part A of the bonding composition was prepared in two separate stages. First, a so-called "arrested resin solution" was prepared using the following proportions:

| | Parts |
|---|---|
| Resorcinol | 5.1 |
| NaOH flakes | .3 |
| 37% Formaldehyde | 2.15 |
| Water | 4.9 |
| Total | 12.45 |

This arrested solution was prepared by first adding the water to a suitable tank or drum. The NaOH flakes were then added and dissolved by stirring followed by addition and dissolution of the resorcinol. Thereafter, the formaldehyde was added, considerable heat being generated. The tank was cooled to prevent boiling and, after allowing the contents to cool, the resulting composition was stored in stainless steel or lined drums sealed to prevent entrance of air. This composition may be stored for an indefinite period of time as compared to not more than about 20 hours for the Part A composition of Example I.

The required amount of the arrested resin solution (12.45 parts) was transferred from the storage drum to the reaction tank. To this arrested resin solution was added 4.3 parts of 37% formaldehyde and 108 parts of water, the water being added first, with agitation. The resulting mixture was aged for from 1–6 hours at 80–84° F.

After the ageing period, a dispersion with Hycar latex was prepared as in Example I.

EXAMPLE III

This example illustrates preparation of a dual primed polyethylene terephthalate fabric and the bonding thereof to butadiene-acrylonitrile rubber.

A first primer was prepared by dissolving sufficient methylene bis (4-phenylisocyanate), for example, Hylene M-50, in xylene freed from moisture to provide a 5% solids solution.

A piece of 5 oz. polyethylene terephthalate (Dacron) fabric was then padded through the xylene solution so as to leave 1.5-1.75% Hylene solids on the cloth. The fabric was dried at 220° F. for solvent removal.

The thus treated fabric was then run through a 20% aqueous dispersion or emulsion of second primer, namely, the product of Example II (prepared from "arrested master"), and the pad squeeze rolls. This was done two times so as to get a solids add-on of 12-15%. The fabric was dried at 220° F. after each passage through the squeeze rolls.

A conventionally compounded butadiene-acrylonitrile (Buna N) sheet (.040 inch thick) was then pressed into contact with the dual primed fabric and vulcanized at 280° F. for 60 minutes.

The fabric processed in this manner exhibited adhesion to the rubber of 33 pounds per inch width on a peel test when the test jaws were separated at a rate of 2" per minute.

Substantially equivalent results were obtained using the product of Example I as the second primer with and without the inclusion of zinc oxide (10% based on the latex solids in parts by weight).

In contrast, adhesion amounted to only about 5 pounds per inch width with the unprimed fabric; about 5 pounds per inch with the fabric primed only with the polyisocyanate; and about 16 pounds per inch width with the fabric primed only with the latex/resole emulsion.

It will be appreciated that various modifications may be made in the invention described herein. For instance, any of the other organic polyisocyanates referred to above may be substituted for the particular diisocyanate utilized in the foregoing examples. Accordingly, the scope of the invention is defined in the following claims wherein.

I claim:

1. In a process for bonding polyethylene terephthalate fibers to butadiene-acrylonitrile rubber, the improvement which comprises first treating said polyethylene terephthalate fibers with an organic solvent solution of an organic polyisocyanate, drying the thus treated polyethylene terephthalate fibers, then treating said fibers with an aqueous composition including a resole and a butadiene-acrylonitrile latex and again drying the thus treated material, said treating and drying steps preceding the application of the butadiene-acrylonitrile rubber to said polyethylene terephthalate.

2. The process of claim 1 wherein said butadiene-acrylonitrile rubber is one containing about 25 to 45% by weight bound acrylonitrile.

3. The process of claim 1 including the further step of applying said rubber to the dried, dual treated polyethylene-terephthalate fibers and then vulcanizing the same.

4. The process of claim 1 wherein the amount of polyisocyanate applied to said polyethylene terephthalate is at least 0.5%, based on the weight of dry fibers and the amount of latex/resole composition is between 5 and 15%, based on the weight of the dry fibers.

5. The product obtained by the process of claim 3.

References Cited by the Examiner

UNITED STATES PATENTS

| 2,990,313 | 6/1961 | Knowles et al. | 154—139 |
| 2,991,258 | 7/1961 | Howard et al. | |

FOREIGN PATENTS 595,290 12/1947 Great Britain.

EARL M. BERGERT, *Primary Examiner.*

CARL M. KRAFFT, *Examiner.*

R. I. SMITH, *Assistant Examiner.*